Patented Feb. 14, 1939

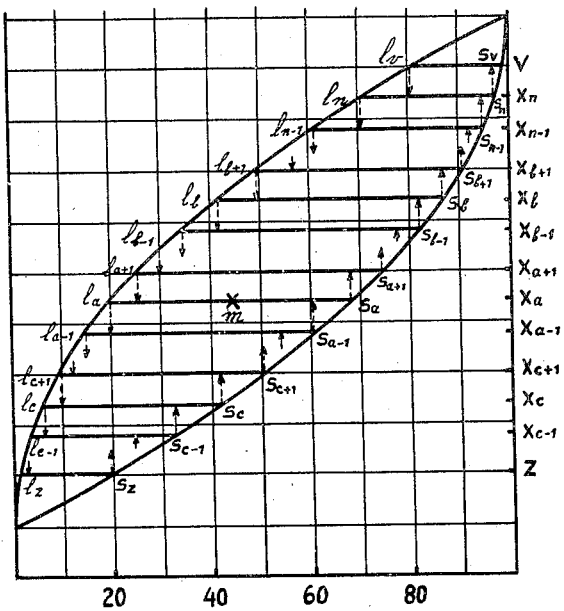
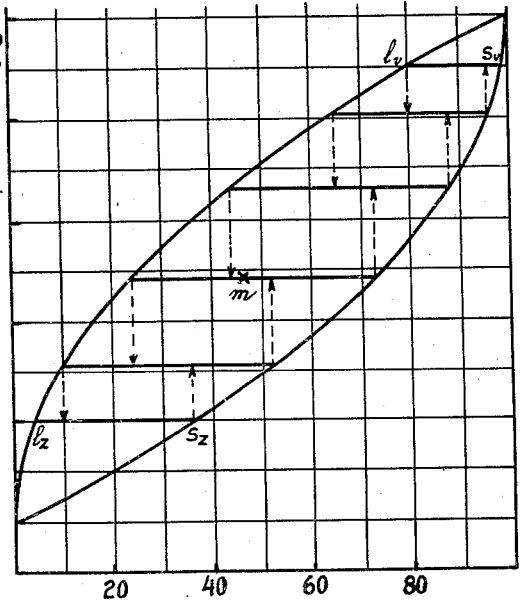

2,147,222

UNITED STATES PATENT OFFICE 2,147,222

PROCESS FOR THE GRADUAL SEPARATION OF MIXTURES ACCORDING TO THE COUNTERCURRENT PRINCIPLE

Jacobus Petrus Treub, Gouda, Netherlands, assignor to Naamlooze Vennootschap: Vereenigde Fabrieken van Stearine, Kaarsen en Chemische Producten, Gouda, Netherlands Application January 17, 1935, Serial No. 2,295
In the Netherlands January 22, 1934

9 Claims. (Cl. 87—12)

The separation of mixtures into their components is often effected in stages, e. g. in the case of mixed crystals by pressing or centrifuging the material at different temperatures, by repeatedly recrystallizing same with the aid of solvents or by successively applying separating processes of a different character, that is, by first pressing the material at different temperatures and subsequently recrystallizing the same with the aid of a solvent.

The sum of the quantities of material to be treated in the various separation stages in order to separate a given quantity of material into the desired final products and the cost of manufacture connected therewith, are greatly influenced by the manner in which a separation in stages is conducted. If, for instance separation is effected in three stages, the raw material being introduced in the intermediate stage, the total quantity of material to be treated in those three stages together, in order to separate a unit quantity of raw material completely into its final products may lie between a certain minimum value and the value $\infty$, and when working without a guiding principle, one is likely in general to treat more than the required amount of material.

I have now found that for a gradual separation of hydrocarbon mixtures and fatty acid mixtures into solid and liquid material in which the separation stages may consist of similar operations to be carried out under different circumstances, or of different operations, in which separation in each stage is as complete as possible, and in which the transport of intermediate products between the separation stages is effected by passing the solid phase obtained in any separation stage to the next separation stage, from which the liquid phase is passed to the former, and vice versa (this method of transporting the intermediate products hereafter being indicated by the term "countercurrent") the total quantity of material to be treated will be minimum if the number of intermediate stages is taken as large as possible, with this restriction that material introduced in any separation stage be of a composition lying between the average value of the compositions of the phases moving in countercurrent between the stage of separation where the material is introduced and the first stage of separation situated on one side of the said introduction stage, and the average value of the composition of the phases moving in countercurrent between the stage of separation where the material is introduced and the first stage of separation situated at the other side of the said introduction stage.

This may be explained by means of an example.

In Figure 1 it is supposed that a raw material having the composition $m$ is gradually separated into the two final products $s_v$ and $l_z$, in which process beside the stages V and Z in which the final products are obtained, the stages $$X_a, X_{a+1}, \ldots X_n \text{ and } X_{a-1}, \ldots X_c, X_{c-1}$$

are used as intermediate stages. The compositions of the mixtures, the properties of the mixtures or the functions of the properties respectively of the mixtures which are linear functions of the compositions, form the abscissae, the conditions under which the separation in the different stages is effected (as for instance pressure, temperature, quantity of solvent, etc.) the ordinates. For greater simplicity it has been assumed that the compositions of the products obtained in the said separation stages are represented by two continuous curves.

The above mentioned principle may now be mathematically expressed by stating that in order to obtain the minimum value for the amount of material to be treated when the raw material $m$ is introduced in the stage $X_a$ the following conditions are to be fulfilled:

$$\tfrac{1}{2} \cdot (s_{a-1} + l_a) < m < \tfrac{1}{2} \cdot (s_a + l_{a+1})$$

whereas for any desired stage of separation $X_b$ or $X_c$ the following conditions must be fulfilled:

$$s_{b-1} < \tfrac{1}{2}(s_b + l_{b+1}) \text{ and } l_{b+1} > \tfrac{1}{2}(s_{b-1} + l_b) \quad (1)$$

or $$s_{c-1} < \tfrac{1}{2}(s_c + l_{c+1}) \text{ and } l_{c+1} > \tfrac{1}{2}(s_{c-1} + l_c) \quad (2)$$

For the explanation of this formula and those that will be mentioned below we refer to Dr. J. P. Treub's publication in the periodical "Recueil des Travaux Chimiques des Pays Bas, 1934, pages 497–524."

When studying Figure 1 it is evident at once that more material is treated here than is really necessary, since:

$$s_{b-1} > \tfrac{1}{2}(s_b + l_{b+1}) \text{ and } l_{b+1} < \tfrac{1}{2}(s_{b-1} + l_b)$$
$$s_{c-1} > \tfrac{1}{2}(s_c + l_{c+1}) \text{ and } l_{c+1} < \tfrac{1}{2}(s_{c-1} + l_c)$$
$$s_{n-1} > \tfrac{1}{2}(s_n + l_v) \text{ and } l_v < \tfrac{1}{2}(s_{n-1} + l_n)$$

Figure 2 presents a diagrammatic example of intermediate stages in which the total quantity of material to be treated is the minimum.

It is evident that the expressions "raw material" and "final product" in the preceding text are only used in relation to the relevant separation system and that the raw material as well as the final products of a combination of separating processes may constitute intermediate products in a complete manufacturing process. That is, the terms "raw material" and "final product" refer to individual steps. The material entering any step is the "raw material" for that step and the material leaving that step is the "final product" of that step.

Attention is also called to the fact that the process is not limited to binary mixtures. The examples given in the drawing not only indicate binary systems, but generally systems according to which in each separation stage there is conducted a separation into two phases, each one of which may contain in unlimited number of components. Neither is it necessary that only two final products should be produced. If, for example, in Figure 1 not only $s_v$ and $l_z$ are final products but also $l_b$, we have two separating systems connected with each other to both of which the principle of the invention can be applied, viz. one system comprising the raw material $m$ and the final products $l_z$ and $s_{b-1}$ and a system connected with the same comprising the raw material $s_{b-1}$ and the final products $l_b$ and $s_v$.

The invention will be further explained by the following example:

*Example*

For preparing palmitic acid from palm oil fatty acids it is usual first to re-crystallize the fatty acids of palm oil from benzine. The solid fatty acids obtained may be further purified either by re-crystallizing a second time, or after removal of the solvent by pressing at a more elevated temperature. Besides there are produced liquid fatty acids which, also after the removal of the solvent and after cooling, may be freed from solid fatty acids.

By re-crystallizing one part of palm oil fatty acids, having a solid fatty acid content of 50 per cent from two parts of benzine, we obtain a solid phase $s_x$ containing 85 per cent of solid fatty acid and a liquid phase $l_k$ containing 40 per cent of solid fatty acid, all calculated on total fatty acid. After removal of the benzine the solid phase $s_x$ was pressed in a hydraulic press at a temperature of 48° C., producing a solid phase $s_v$ containing 96 per cent of solid fatty acid and a liquid phase $l_v$ containing 60 per cent of solid fatty acid. The liquid phase $l_x$ treated in the same manner at a temperature of 6° C. will yield a solid phase $s_z$ containing 83 per cent of solid fatty acid and a liquid phase $l_z$ containing 1 per cent of solid fatty acid.

The two phases $l_v$ and $s_z$ together with fresh raw material are again subjected to re-crystallization; the two phases $s_v$ and $l_z$ are final products.

The following table contains the results obtained:

Pressing at $t_v = 48°$ C_____ $s_v = 96$ $l_v = 60$
Recrystallizing from benzine_____ $s_x = 85$ $l_x = 40$
Pressing at $t_z = 6°$ C_____ $s_z = 83$ $l_z = 1$ In this operation a larger total quantity of material is treated than is necessary. In the first place, the composition of the raw material (50 per cent of solid fatty acid) would have to lie between $$\tfrac{1}{2}(s_z + l_x) = 61.5 \text{ and } \tfrac{1}{2}(s_x + l_v) = 72.5$$

This is not the case here. In order to work economically the raw material would have to be introduced in the stage Z. In the second place $s_z < \tfrac{1}{2}(s_x + l_v)$, consequently $< 72.5$ and $$l_v > \tfrac{1}{2}(s_x + l_x)$$

consequently $> 61.5$, which is not the case either, since $s_z = 83$ and $l_v = 60$. Therefore, the re-crystallization from benzine is evidently uneconomical and it will be sufficient to press at 6° and at 48° C., the raw material being introduced in the separating stage Z at 6° C.

I claim:

1. A process for the separation in stages of mixtures that can only be separated in one step into two phases each of which will contain appreciable quantities of each ingredient and therefore where more than one step is required to obtain substantially complete separation comprising subjecting the mixture to a plurality of separation treatments of the same character involving the formation of two phases of varying composition and the separation of the said phases according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

2. A process for the separation in stages of mixtures that can only be separated in one step into two phases each of which still contains appreciable quantities of each ingredient and therefore where more than one step is required to obtain substantially complete separation comprising subjecting the mixture to a plurality of separation treatments of a different character involving the formation of two phases of varying composition and the separation of the said phases according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

3. A process for the separation in stages of mixtures that can only be separated in one step into two phases each of which still contains appreciable quantities of each ingredient and therefore where more than one step is required to obtain substantially complete separation comprising subjecting the mixture to a plurality of separation treatments of the same character involving the formation of a solid and a liquid phase of varying composition and the separation of the said phases according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

4. A process for the separation in stages of mixtures that can only be separated in one step into two phases each of which still contains appreciable quantities of each ingredient and therefore where more than one step is required to obtain substantially complete separation comprising subjecting the mixture to a plurality of separation treatments of a different character involving the formation of a solid and a liquid phase of varying composition and the separation of the said phases according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

5. A process for the separation in stages of mixtures that can only be separated in one step into two phases each of which still contains appreciable quantities of each ingredient and therefore where more than one step is required to obtain substantially complete separation comprising subjecting the mixture to a plurality of separation treatments of the same character involving the formation of a solid and a liquid phase of varying composition and the separation of the said phases by pressing the mixtures of solid and liquid according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

6. A process for the separation in stages of hydrocarbon mixtures into paraffin wax and liquid paraffins comprising subjecting the mixture to a plurality of separation treatments of the same character involving the formation of a solid and a liquid phase of varying composition and the separation of the said phases according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

7. A process for the separation in stages of hydrocarbon mixtures into paraffin wax and liquid paraffins comprising subjecting the mixture to a plurality of separation treatments of a different character involving the formation of a solid and a liquid phase of varying composition and the separation of the said phases according to methods known per se, the transport of the separated phases between the stages taking place in countercurrent and the material introduced in any separation stage having a composition which is intermediate between the average of the compositions of the mixture moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

8. A process for the separation in stages of fatty acid mixtures into solid and liquid fatty acids comprising subjecting the mixture to a plurality of separation treatments of the same character involving the formation of a solid and a liquid phase of varying composition and the separation of the said phases according to methods known per se, the transport of the separated phases between the stages taking place is countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

9. A process for the separation in stages of fatty acid mixtures into solid and liquid fatty acids comprising subjecting the mixture to a plurality of separation treatments of a different character involving the formation of a solid and a liquid phase of varying composition and the separation of the said phases according to methods known per se, the transport of the separated phases between the stages taking place in countercurrent and the material introduced in any separation stage having a composition which is intermediate between the average of the compositions of the mixtures moving in countercurrent between the said separation stage and the next separation stage on one side and the average of the compositions of the phases moving in countercurrent between the first mentioned separation stage and the next separation stage on the other side the number of separation stages being as large as compatible with the aforementioned conditions.

JACOBUS PETRUS TREUB.